Patented Dec. 14, 1937

2,102,350

UNITED STATES PATENT OFFICE 2,102,350

PROCESS FOR MANUFACTURING AMINO SULPHONIC ACID

Paul Baumgarten, Berlin, Germany, assignor to E. I. du Pont de Nemours and Company, Wilmington, Del., a corporation of Delaware No Drawing. Application June 30, 1936, Serial No. 88,090. In Germany May 21, 1935

7 Claims. (Cl. 23—190)

My present invention relates to a new process for manufacturing amino sulphonic acid and is based on the observation that this compound is formed when acting with fuming sulphuric acid upon urea.

When urea is introduced into fuming sulphuric acid, a strong reaction takes place. With evolution of gas a white crystalline product separates which consists of amino sulphonic acid. Probably, the reaction occurs according to the following scheme:

that means, that in the first stage a carbamino sulphonic acid is formed by the action of $SO_3$ upon urea. This intermediate product is decomposed by sulphuric acid with formation of cyanic acid which is unstable under the said reaction conditions, and of amino sulphonic acid which is insoluble in sulphuric acid and thus is separated.

According to the scheme given above, a similar result is obtained when reacting $SO_3$ with urea and when treating the reaction product with water or preferably with sulphuric acid.

The examples following hereafter serve to illustrate my invention without limiting it to the specific details given therein. The parts are by weight if not otherwise indicated.

*Example 1.*—3 parts of finely pulverized urea are introduced in small portions, while cooling, into 35 parts of oleum containing about 35 per cent. of $SO_3$. A violent reaction occurs immediately with evolution of gas which persists for some time after the introduction of the total amount of the urea and which may be completed, if desired, by warming the mixture on the water bath. After standing for some time, the amino sulphonic acid formed is completely separated and is filtered off with a glass suction filter. The yield is 4.5 parts. After recrystallization from water, the pure amino sulphonic acid, melting at 206° C., is obtained.

This yield may be essentially improved by mitigating the violence of reaction of urea with oleum, which may be done by a suitable cooling of the oleum and by slowly introducing the urea. When the reaction mixture then is warmed, the double decomposition with evolution of gas and separation of amino sulphonic acid is brought to an end.

On the other hand, urea may be dissolved in sulphuric acid of about 100 per cent. strength with formation of the sulphate; if then oleum with a high content of $SO_3$ is added, the reaction is easily completed by warming.

In this manner, the total nitrogen of the urea may be used for the formation of amino sulphonic acid according to the equation:

Similar conditions prevail when reacting urea in a first stage with $SO_3$ and then treating the reaction compound with sulphuric acid.

*Example 2.*—3 parts of finely pulverized urea are introduced, while cooling with ice, so slowly into 35 parts of oleum containing 35 per cent. of $SO_3$, that no violent reaction occurs. The reaction mixture thus obtained is then warmed; with evolution of gas amino sulphonic acid separates. When the evolution of gas has ceased, the mass is cooled and the amino sulphonic acid formed is filtered off with a glass suction filter.

*Example 3.*—3 parts of urea are dissolved, while cooling, in a mixture of 5 parts by volume of concentrated sulphuric acid and 2 parts by volume of oleum containing 70 per cent. of $SO_3$. Then 6 parts by volume of oleum of 70 per cent. strength and 5 parts by volume of concentrated sulphuric acid are added and the mixture is warmed. The separated amino sulphonic acid formed with evolution of gas is filtered off with a glass suction filter, the yield being about 9 parts by weight.

*Example 4.*—Into a cold mixture of 200 parts by volume of concentrated sulphuric acid of 95.6 per cent. strength and 70 parts by volume of oleum containing 70 per cent. of $SO_3$, 60 parts of urea are introduced while stirring and cooling, so that the temperature does not surpass 50° C. 80 parts of oleum of the same strength are added and, in order to avoid a momentary violent reaction of the mixture kept at room temperature, the double decomposition is performed in several portions by warming them on the water bath, while stirring, whereupon after a short time a vivid evolution of gas begins with separation of amino sulphonic acid. When the reaction ceases, a further portion of the aforesaid mixture is added and this sequence of reactions is continued until the whole mass is consumed. Then the amino sulphonic acid is separated as described in the foregoing examples.

The yield of amino sulphonic acid depends upon the $SO_3$ content of the fuming sulphuric acid, is improved with a higher content of $SO_3$ and becomes nearly quantitative if the $SO_3$ content corresponds (cf. the second formula given above) to about 45 per cent., that is, to the pyrosulphonic acid. The temperature at which the double decomposition is performed may be lowered in the case of a higher $SO_3$ content of the reacting acid.

*Example 5.*—30 parts of urea are dissolved in 50 parts by volume of sulphuric acid of 100 per cent. strength and to this solution are added at a temperature of about 40° C. 75 parts by volume of oleum containing 70 per cent. of $SO_3$. On warming this mixture in portions on the water bath, 93 parts of crude amino sulphonic acid are obtained containing 96.4 per cent. of $NH_2 SO_3H$, i. e., the yield is 92.4 per cent. of the theoretical amount calculated on urea. When using 90 parts by weight instead of 75 parts of oleum of 70 per cent. strength, the yield calculated on pure amino sulphonic acid and on the urea, is 94 per cent.

What I claim is:—

1. The process for producing amino sulphonic acid which comprises reacting urea with fuming sulphuric acid.

2. The process for producing amino sulphonic acid which comprises introducing urea into concentrated sulphuric acid and adding fuming sulphuric acid.

3. The process for producing amino sulphonic acid which comprises introducing urea into cooled fuming sulphuric acid and thereupon warming the mixture.

4. The process for producing amino sulphonic acid which comprises dissolving urea in concentrated sulphuric acid, adding oleum containing 70 per cent. of $SO_3$, and warming the mixture.

5. Process for preparing sulphamic acid which comprises reacting urea with oleum.

6. Process for preparing sulphamic acid which comprises dissolving urea in concentrated sulphuric acid and reacting the resulting solution with oleum.

7. The process for producing amino sulphonic acid which comprises reacting urea with sulphur trioxide in the presence of sulphuric acid.

PAUL BAUMGARTEN.

CERTIFICATE OF CORRECTION.

Patent No. 2,102,350.   December 14, 1937.

PAUL BAUMGARTEN.

It is hereby certified that error appears in the printed specification of the above numbered patent requiring correction as follows: Page 1, second column, line 43, for the word "vivid" read violent; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

sulphonic acid. The temperature at which the double decomposition is performed may be lowered in the case of a higher $SO_3$ content of the reacting acid.

*Example 5.*—30 parts of urea are dissolved in 50 parts by volume of sulphuric acid of 100 per cent. strength and to this solution are added at a temperature of about 40° C. 75 parts by volume of oleum containing 70 per cent. of $SO_3$. On warming this mixture in portions on the water bath, 93 parts of crude amino sulphonic acid are obtained containing 96.4 per cent. of $NH_2 SO_3H$, i. e., the yield is 92.4 per cent. of the theoretical amount calculated on urea. When using 90 parts by weight instead of 75 parts of oleum of 70 per cent. strength, the yield calculated on pure amino sulphonic acid and on the urea, is 94 per cent.

What I claim is:—

1. The process for producing amino sulphonic acid which comprises reacting urea with fuming sulphuric acid.

2. The process for producing amino sulphonic acid which comprises introducing urea into concentrated sulphuric acid and adding fuming sulphuric acid.

3. The process for producing amino sulphonic acid which comprises introducing urea into cooled fuming sulphuric acid and thereupon warming the mixture.

4. The process for producing amino sulphonic acid which comprises dissolving urea in concentrated sulphuric acid, adding oleum containing 70 per cent. of $SO_3$, and warming the mixture.

5. Process for preparing sulphamic acid which comprises reacting urea with oleum.

6. Process for preparing sulphamic acid which comprises dissolving urea in concentrated sulphuric acid and reacting the resulting solution with oleum.

7. The process for producing amino sulphonic acid which comprises reacting urea with sulphur trioxide in the presence of sulphuric acid.

PAUL BAUMGARTEN.

CERTIFICATE OF CORRECTION.

Patent No. 2,102,350.                                                                    December 14, 1937.

PAUL BAUMGARTEN.

It is hereby certified that error appears in the printed specification of the above numbered patent requiring correction as follows: Page 1, second column, line 43, for the word "vivid" read violent; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,102,350.  December 14, 1937.

PAUL BAUMGARTEN.

It is hereby certified that error appears in the printed specification of the above numbered patent requiring correction as follows: Page 1, second column, line 43, for the word "vivid" read violent; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.